(12) United States Patent
Zhao et al.

(10) Patent No.: US 9,770,993 B2
(45) Date of Patent: Sep. 26, 2017

(54) ELECTRIC VEHICLE CHARGING STATION

(71) Applicant: GM GLOBAL TECHNOLOGY OPERATIONS LLC, Detroit, MI (US)

(72) Inventors: Xiang Zhao, Novi, MI (US); Dalong Gao, Rochester, MI (US); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

(21) Appl. No.: 14/275,954

(22) Filed: May 13, 2014

(65) Prior Publication Data

US 2014/0354229 A1  Dec. 4, 2014

Related U.S. Application Data

(60) Provisional application No. 61/829,601, filed on May 31, 2013.

(51) Int. Cl.
    *H02J 7/00*     (2006.01)
    *H02J 7/14*     (2006.01)
    *B60L 11/18*     (2006.01)

(52) U.S. Cl.
CPC ......... *B60L 11/1846* (2013.01); *B60L 11/182* (2013.01); *B60L 11/1818* (2013.01); *B60L 11/1827* (2013.01); *B60L 11/1835* (2013.01); *B60L 11/1824* (2013.01); *B60L 2230/22* (2013.01); *Y02T 10/7005* (2013.01); *Y02T 10/7088* (2013.01); *Y02T 90/121* (2013.01); *Y02T 90/125* (2013.01); *Y02T 90/128* (2013.01);

(Continued)

(58) Field of Classification Search
USPC ....... 320/109, 108, 107, 104, 137, 101, 128, 320/149, 162, 163; 439/310, 34, 374, 39; 180/65.29, 65.1, 65.21
See application file for complete search history.

(56) References Cited

U.S. PATENT DOCUMENTS 5,596,258 A * 1/1997 Kimura ................. B60L 3/0084
    320/109
5,821,731 A * 10/1998 Kuki ................... B60L 11/1805
    320/108

(Continued)

FOREIGN PATENT DOCUMENTS

CN     202395469 U     8/2012
CN     103023091 A     4/2013

(Continued)

*Primary Examiner* — Alexis Pacheco
(74) *Attorney, Agent, or Firm* — Quinn IP Law (57) ABSTRACT

A vehicle charging station includes a track configured to extend across a plurality of vehicle parking spaces and a movable charging apparatus supported by the track. The movable charging apparatus is translatable along the track between the plurality of vehicle parking spaces to charge one or more vehicles. The movable charging apparatus includes a base slidably coupled with the track, an end effector in mechanical communication with the base and configured to electrically couple with an electric vehicle disposed within one of the plurality of vehicle parking spaces, and a power delivery circuit configured to receive an electrical charge from a power source and to controllably provide the electrical charge to the electric vehicle.

19 Claims, 10 Drawing Sheets

(52) U.S. Cl.
 CPC ................ *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 6,157,162 A * | 12/2000 | Hayashi | B60L 11/1818 320/104 |
| 7,999,506 B1 * | 8/2011 | Hollar | B60L 11/1818 320/104 |
| 9,056,555 B1 * | 6/2015 | Zhou | B60L 11/1827 |
| 2009/0079388 A1 | 3/2009 | Reddy | |
| 2011/0077809 A1 * | 3/2011 | Leary | B60L 11/1824 701/22 |
| 2012/0233062 A1 * | 9/2012 | Cornish | B25J 11/00 705/39 |
| 2012/0286730 A1 * | 11/2012 | Bonny | B60L 11/1827 320/109 |
| 2013/0076902 A1 * | 3/2013 | Gao | B25J 9/042 348/148 |
| 2013/0088194 A1 * | 4/2013 | Hunter | B60L 11/182 320/108 |
| 2013/0193918 A1 * | 8/2013 | Sarkar | B60L 3/04 320/109 |
| 2013/0314037 A1 * | 11/2013 | Caffy | B60L 11/1825 320/109 |

FOREIGN PATENT DOCUMENTS

| | | |
|---|---|---|
| CN | 103038975 A | 4/2013 |
| DE | 102011079870 A1 | 1/2013 |
| EP | 2332772 A2 | 6/2011 |
| EP | 2612785 A1 | 7/2013 |
| WO | 2013041133 A1 | 3/2013 |

* cited by examiner

ELECTRIC VEHICLE CHARGING STATION

CROSS REFERENCE TO RELATED APPLICATIONS

This application claims the benefit of priority from U.S. Provisional Patent No. 61/829,601, filed May 31, 2013, which is hereby incorporated by reference in its entirety.

TECHNICAL FIELD

The present disclosure relates to an electric vehicle charging station for a plurality of electric vehicles.

BACKGROUND

Various types of automotive vehicles, such as electric vehicles (EVs), extended-range electric vehicles (EREVs), and hybrid electric vehicles (HEVs) are equipped with an energy storage system that requires periodic charging. Typically, this energy storage system may be charged by connecting it to a power source, such as an AC supply line. While it may be advantageous to re-charge the vehicle's energy storage system before or after each vehicle use, current systems require the vehicle operator to manually plug the supply line into the vehicle. Such manual operation may not always be convenient for the vehicle operator, which may result in missed charging instances and/or subsequently degraded vehicle performance.

SUMMARY

A vehicle charging station includes a track configured to extend across a plurality of vehicle parking spaces and a movable charging apparatus supported by the track. The movable charging apparatus is translatable along the track between the plurality of vehicle parking spaces to charge one or more vehicles. The movable charging apparatus includes a base slidably coupled with the track, an end effector in mechanical communication with the base and configured to electrically couple with an electric vehicle disposed within one of the plurality of vehicle parking spaces, and a power delivery circuit configured to receive an electrical charge from a power source and to controllably provide the electrical charge to the electric vehicle.

The above features and advantages and other features and advantages of the present invention are readily apparent from the following detailed description of the best modes for carrying out the invention when taken in connection with the accompanying drawings.

DETAILED DESCRIPTION

Figure 1:
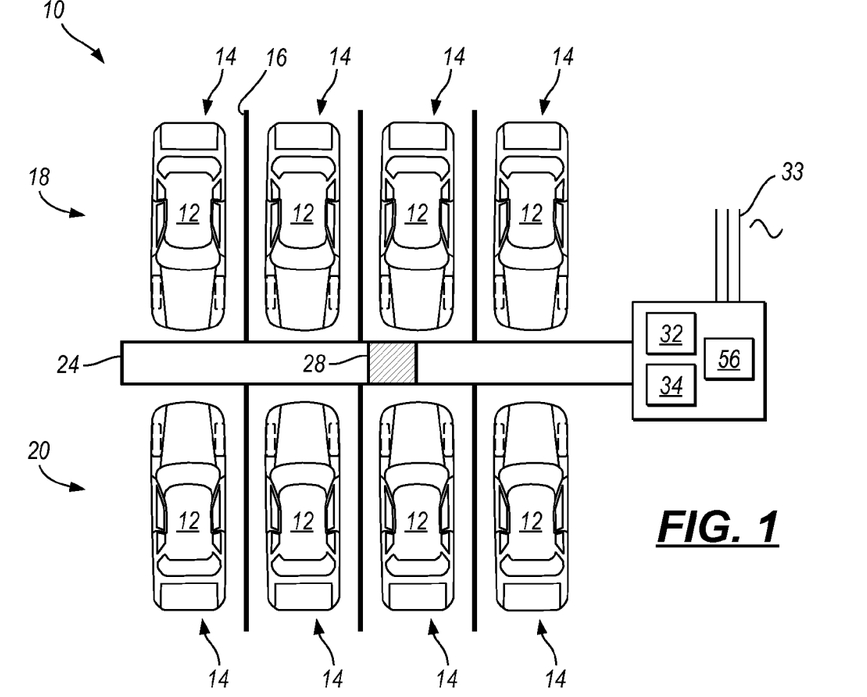
FIG. 1 is a schematic plan view of an electric vehicle charging station employing a ground mounted movable charging apparatus.

Referring to the drawings, wherein like reference numerals are used to identify like or identical components in the various views, FIG. 1 schematically illustrates an electric vehicle charging station 10 for charging or re-charging the primary energy storage device of a plurality of electric vehicles 12. As used herein, an electric vehicle 12 may encompass any vehicle that uses an electric motor as a source of power for vehicle propulsion. While an automobile will be used as the exemplary vehicle for the purpose of this description, other vehicles may similarly be used. Some examples of electric vehicles include, but are not limited to, electric-only electric vehicles (EVs), plug-in hybrid electric vehicles (PHEVs), extended range electric vehicles (EREVs). These vehicles may include passenger cars, crossover vehicles, sports-utility vehicles, recreational vehicles, trucks, buses, commercial vehicles, etc.

An electric vehicle 12 may operate by expending electrical energy from an energy storage device, such as a vehicle battery, to power an electric motor during a period of propulsion. After a prolonged period of energy depletion, the vehicle battery may require re-charging before continued propulsion may resume. Such re-charging may occur by coupling the vehicle battery to a source of electrical power either directly, or through one or more intermediate components.

In general, the electric vehicle charging station 10 may be a stationary apparatus that may be disposed in a parking lot or other vehicle storage area that includes a plurality of parking spaces 14 (e.g., parking garage, valet parking area, fleet vehicle storage area, etc. . . . ). As used herein, a parking space 14 is an area that is intended to receive a vehicle for a period of time. Parking spaces 14 may be delineated by visual indicators 16 provided on the ground (e.g., as with a parking lot), or by physical objects (as occurs at a conventional gas station where a plurality of gasoline pumps crudely delineate the respective parking spaces that are intended to receive a vehicle for refueling).

Figure 2:
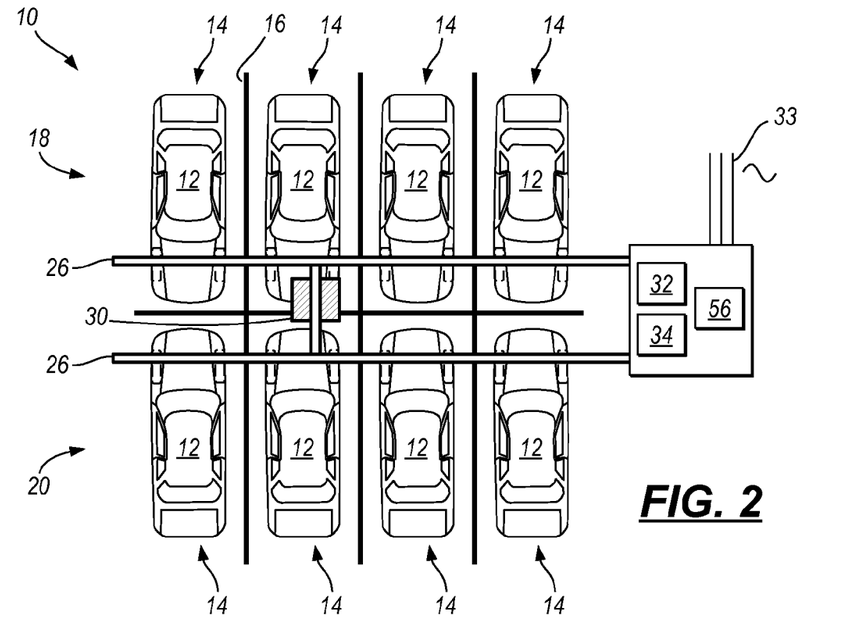
FIG. 2 is a schematic plan view of an electric vehicle charging station employing an overhead mounted movable charging apparatus.

FIGS. 1 and 2 each illustrate a recharging area that includes eight parking spaces 14, organized into two rows 18, 20 of four spaces 14. Each charging station 10 may include a respective track 24, 26 that extends across a plurality of the parking spaces 14 (e.g., along each row 18, 20), and allows a movable charging apparatus 28, 30 to access each vehicle 12 to facilitate selective recharging of the vehicle's battery.

In general, the track 24, 26 may have two general configurations, namely a ground-level track 24 (as shown in FIG. 1), and an overhead track 26 (as shown in FIG. 2). Regardless of the specific configuration, each track 24, 26 may support its respective movable charging apparatus 28, 30, and allow the charging apparatus 28, 30 to translate along the track 24, 26 to access each vehicle 12 in the station 10. As will be described in greater detail below, the charging apparatus 28, 30 may be coupled with a power supply circuit 32 and charging controller 34 that may each be used by the charging apparatus 28, 30 to recharge a battery of one or more of the parked electric vehicles 12.

Figure 3:
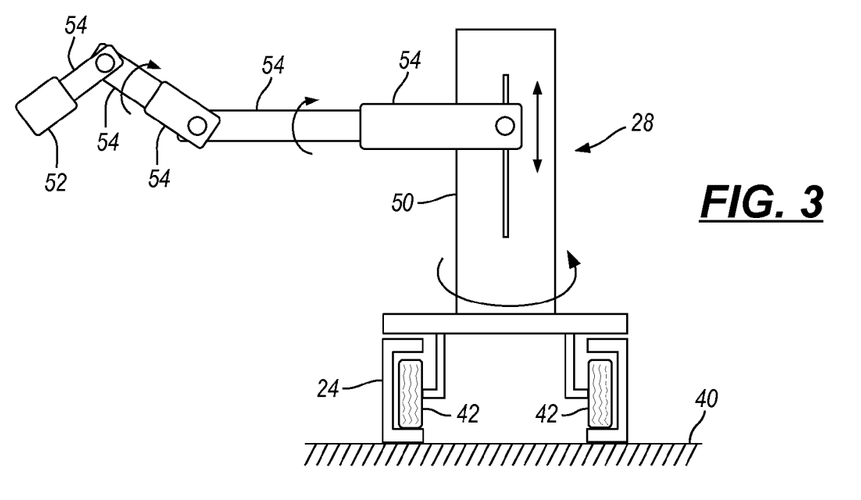
FIG. 3 is a schematic side view of a ground mounted movable charging apparatus.
Figure 4:
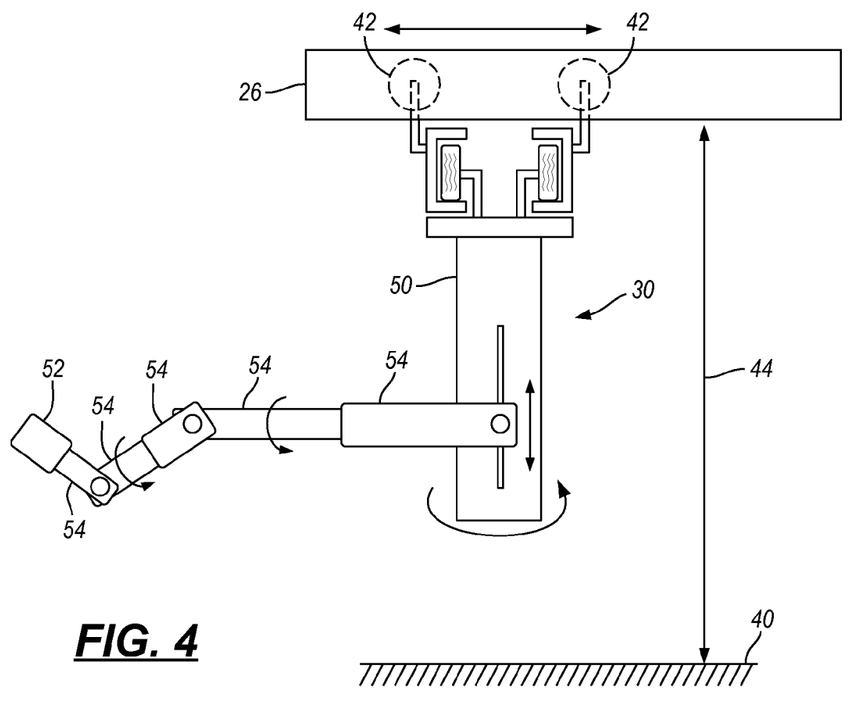
FIG. 4 is a schematic side view of an overhead mounted movable charging apparatus.

FIGS. 3 and 4 illustrate schematic examples of a ground-level track 24 and overhead track 26 (respectively) that are used to support a respective movable charging apparatus 28, 30. As shown in FIG. 3, the ground-level track 24 may be disposed on the ground 40, or substantially on the ground 40 such that the movable charging apparatus 28 is generally disposed above the track 24. The movable charging apparatus 28 may translate along the track 24, for example, using one or more wheels 42 that are configured to ride on or within a portion of the track 24. The ground-level track 24 may permit the charging apparatus 28 to physically translate between the respective vehicles 12, though may require a minimum clearance between the rows 18, 20 that is commensurate with the width of the track 24/charging apparatus 28.

Referring to FIG. 4, the overhead track 26 may be disposed a distance 44 above the ground 40 that is, for example, between 5 and 12 feet. The charging apparatus 30 may generally hang from the track 26 such that the charging apparatus 30 is generally located between the track 26 and the ground 40. While the overhead track 26 may be beneficial from a land-use perspective by allowing the rows 18, 20 to be spaced closer together, the ground-level track 24 may require less infrastructure to implement. In one configuration the overhead track 26 may be hung from a plurality of existing light poles within the parking lot.

Regardless of the form of the track, the movable charging apparatus 28, 30 may generally include a base 50 that is slidably coupled to the track, and an end effector 52 that is mechanically coupled to the base 50. The end effector 52 may be configured to electrically couple with one of the vehicles 12 disposed within an adjacent parking space 14. A description of various embodiments of an end effector 52 may be found below with reference to FIGS. 9-15.

With continued reference to FIGS. 3 and 4, in one configuration, the end effector 52 may be in mechanical communication with the base 50 through a plurality of rigid arm members 54 that may be capable of articulating and/or translating relative to each other. In other configurations, however, the end effector 52 may be mechanically coupled to the base 50 through a flexible electrical cable.

In a basic implementation of the present charging station 10, the end effector 52 may manually positioned/manipulated into electrical communication with a vehicle 12 by a user. For example, if a user wishes to charge his/her vehicle 12, they may slide the charging apparatus 28, 30 to an area proximate to their vehicle 12, and manually place the end effector into electrical communication with a suitable charging receptacle disposed on their vehicle (i.e., where a charging receptacle is meant to generally refer to an electrical connection/plug disposed on the vehicle and in electrical communication with an electrical storage device, such as a battery). In this implementation, any joints provided between the arm members 54 may be purely passive and may allow a user to freely manipulate the end effector 52.

In another configuration, the vehicle charging station 10 may be fully automated, and may be configured to robotically charge a user's vehicle 12 with minimal interaction from the user. In one configuration, the user's involvement in the charging process may be limited to providing an indication of a desired charge and/or enabling the charging apparatus 28, 30 to gain access to a charging receptacle.

In a robotic implementation, the position and orientation of the end effector 52 may be robotically controlled in 5 or more degrees of freedom (for example, 3 translation degrees, and 2 or more rotational degrees) through the selective actuation of one or more joint actuators disposed between one or more arm members 54. The joint actuators and resultant motion of the end effector 52 may be controlled by a robotic controller 56, such as schematically shown in FIGS. 1 and 2. While the following description generally relates to a robotic implementation of the present system 10, certain aspects may similarly be used in a manual version of the system 10 (particularly those that are implemented by the charging controller 34).

Each of the robotic controller 56 and charging controller 34 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The robotic controller 56 and charging controller 34 may be embodied as distinct software modules within a single computing device, or may be embodied as physically separate hardware modules.

The charging controller 34 may be configured to automatically perform one or more charging control algorithms to carry out a charging procedure if the controller 34 determines that a vehicle requires an electric charge. In a similar manner, the robotic controller 56 may be configured to automatically perform one or more motion control algorithms to control the resultant motion of the end effector 52 via the one or more joint motors to effectuate the charging process. Each control/processing routine may be embodied as software or firmware, and may either be stored locally on the respective controller 56, 34, or may be readily assessable by the controller 56, 34.

Figure 5:
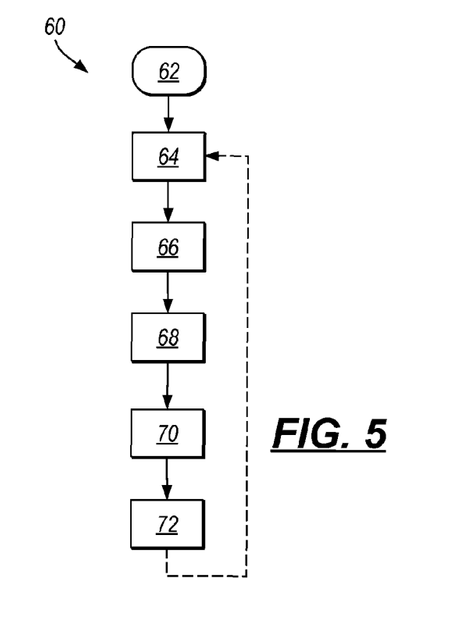
FIG. 5 is a schematic, system-level flow diagram of a charging algorithm.
Figure 6:
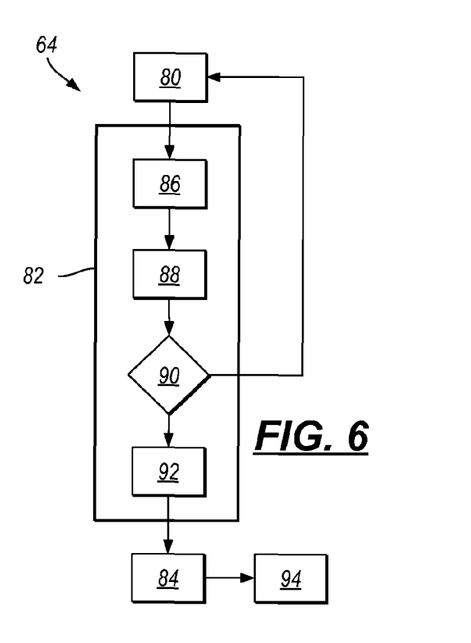
FIG. 6 is a schematic flow diagram of a method of detecting the presence and identity of an electric vehicle requiring a recharge.
Figure 7:
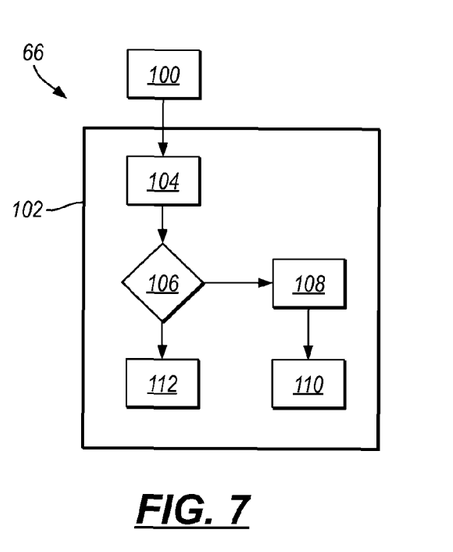
FIG. 7 is a schematic flow diagram of a method of moving a charging apparatus and end effector to a vehicle requiring charging.
Figure 8:
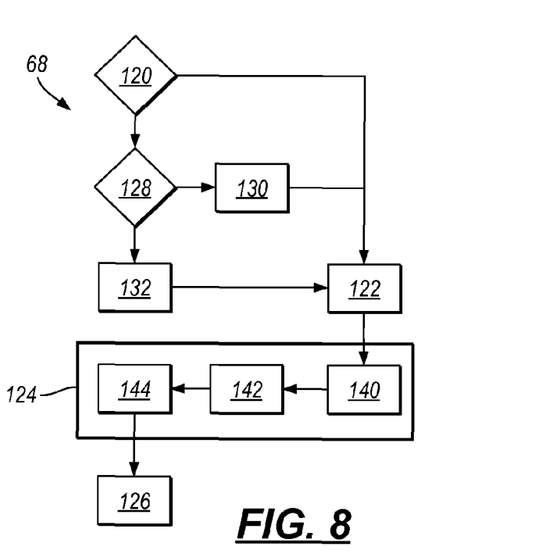
FIG. 8 is a schematic flow diagram of a method of coupling an end effector with a charging receptacle of a vehicle, including opening a door covering the receptacle if needed.

FIG. 5 illustrates a schematic, system-level flow diagram of a charging algorithm 60 that may be executed by the charging controller 34 in a supervisory fashion. The algorithm begins at 62 when the system 10 is energized and/or initialized. At 64 the charging controller 34 may identify the presence and/or identity of one or more vehicles 12 requiring a charge and within a predefined number of parking spaces 14. At 66, the charging controller 34 may instruct the robotic controller 56 to move the charging apparatus 28, 30/end effector 52 to the vehicle requiring charging. The robotic controller 56 may then couple the end effector 52 with a charging receptacle of the vehicle 12 at 68. Once coupled, the charging controller 34 may charge the vehicle at 70 until the vehicle reports a state of charge (SoC) above a particular threshold. Finally, at 72, the charging controller 34 may instruct the robotic controller 56 to disconnect from the vehicle 12 and return to a home position before beginning a subsequent charging procedure. FIGS. 6-8 provide additional detail on various embodiments of steps 64-68.

Once initialized, the charging algorithm 60 may truly begin once an electric vehicle 12 is detected and/or identified within a parking space 14, and it is determined that that particular vehicle requires charging (step 64). As further explained in FIG. 6, step 64 may include three general aspects: presence detection 80; charge determination 82; and user identification 84. Step 64 may begin at 80 when the charging controller 34 receives a sensory indication that a vehicle 12 has entered a parking space 14. The sensory indication may be from, for example, a pressure mat embedded in the ground of the parking space 14, from an ultrasound, laser, or radar proximity detector, from a visual camera associated with the charging station 10, or from an action performed by a user (e.g., push a button to indicate a request for charge).

Once the presence of a vehicle 12 is detected at 80, the charging controller 34 may initiate communication with the vehicle 12 at 86. The communication may be via a data link, such as for example, a satellite-based communication link, a wireless link according to an 802.11 or Bluetooth standard, a point-to-point data link, an RFID data link, or another transponder-based data link. Once a communication link is established at 86, the charging controller 34 may read vehicle battery information and state of charge at 88, compare the state of charge to a threshold at 90, and indicate a required recharge at 92 if the state of charge is below a threshold. In an alternate embodiment, a user may manually request a recharge through some manual input to the system 10 (including smartphone input, or keypad input at a terminal).

Following the detection of a vehicle at 80, and the identification of a required recharge at 82, the charge controller 34 may determine the identification of a user that is associated with, is driving, or owns the vehicle 12 at 84. The user id step may allow the system 10 to account for individual energy consumption, and generate an invoice where applicable. The user identification step 84 may include wirelessly receiving a user identifier via the established communication link, or by manually prompting the user to enter billing information, such as a personal identification number, or a credit card number. Once the user is properly identified, the vehicle 12 may be placed in queue to be charged at 94.

Once the vehicle reaches the top of the charging queue, the charging controller 34 may instruct the robotic controller 56 to move the charging apparatus 28, 30/end effector 52 to the vehicle requiring charging (step 66 from FIG. 5). As shown in FIG. 7, step 66 may generally involve two general aspects: translating the movable charging apparatus 28, 30 to an appropriate location along the track 24, 26 (at 100); and positioning the end effector 52 proximate to a charging receptacle on the vehicle 12 (at 102).

To position the charging apparatus 28, 30 to an appropriate location along the track 24, 26 100, the robotic controller may actuate one or more drive wheels that may allow the charging apparatus 28, 30 to self-propel along the track 24, 26. In another embodiment, the charging apparatus 24, 26 may be coupled with a drive chain that may extend the length of the track and pull the charging apparatus to the appropriate position at the urging of a stationary drive motor. As further illustrated in FIGS. 2 and 4, in another embodiment, the charging apparatus 30 may be capable of a degree of lateral motion relative to the track 26. This lateral motion may be permissible because of the generally low typical hood clearance that may allow the charging apparatus 30 to extend over a portion of the vehicle. In this manner, the lateral motion may permit the end effector to have easier access to the charging receptacle without the need for long extension arms.

Once the charging apparatus 28, 30 is generally positioned in an appropriate position along the track (100) to permit the end effector 52 to move toward the vehicle charging receptacle, the robotic controller 56 may then control the one or more joint actuators (102) associated with the one or more arm members 54 to position the end effector proximate to the charge receptacle. In one embodiment, the positioning of the end effector 52 at 102 may include refining the position of the charging apparatus along the track.

In order to position the end effector 52 at 102, the robotic controller 56 may begin by determining the location of the charging receptacle on the vehicle 12 at 104. This may occur generally via visual identification, by receiving a signal from the vehicle via the communication link, or through a separate transponder or RFID device placed proximate to the charging receptacle. In one embodiment, the charging receptacle may be covered by a door or other selectively removable panel. An RFID chip or other transponder may be affixed to the door or placed adjacent to the receptacle to provide an indication of location.

Once the receptacle is located on the vehicle at 104, the robotic controller 56 may check the spacing of the vehicle 12 relative to any adjacent vehicles at 106. If the spacing is below allowable tolerances the charging routine may end at 108, and the user may be notified at 110. If the clearances are sufficient for the process to continue, the robotic controller 56 may move the end effector 52 to an area proximate to the receptacle at 112 by controlling one or more joint motors. As the end effector 52 is progressing toward the charging receptacle, the robotic controller 56 may continuously monitor sensory feedback for evidence of contact between the arm and a vehicle or other obstruction. If contact is detected, the charging process may abort.

Referring again to FIG. 5, once the end effector 52 is generally aligned with the charging receptacle at 66, the robotic controller 56 may couple the end effector 52 with a charging receptacle of the vehicle 12 at 68. Prior to making such a connection, however, it may be necessary to open a door that covers the receptacle. As generally illustrated in FIG. 8, step 68 may begin by determining if the charging door is open (at 120). If the door is already open, the robotic controller 56 may select the appropriate end effector at 122, guide the end effector 52 towards the charging receptacle at 124, and mechanically and/or electrically couple the end effector 52 with the charging receptacle at 126.

In one configuration, the end effector 52 may be guided toward the charging receptacle at 124 using one or more indicia that may be perceived from the receptacle. For example, the end effector 52 may include a sensor that may receive electromagnetic radiation and/or sound pressure waves from the receptacle at 140. The robotic controller 56 may identify one or more indicia of the charging receptacle from the received radiation/waves at 142, and may use the positioning of the indicia as feedback during the final approach at 144. In one configuration, the received electromagnetic radiation may be visible light having a wavelength between 400 nm and 750 nm. Likewise, the sound pressure waves may have a frequency greater than 30 kHz (i.e., ultrasound).

If the charging door is not already open at 120, then the robotic controller 56 may determine at 128 if the vehicle 12 is equipped with remote door opening capabilities. If so, the robotic controller 56 may send a signal at 130 to instruct the vehicle to open the door, and then may proceed to select the appropriate end effector at 122. If the vehicle is not equipped with remote door opening capabilities, then at 132, the robotic controller 56 may manipulate the end effector 52 to manually open the door by pulling the door open or by pushing the door inward to release a click-lock feature followed by pulling it to a fully open state.

Referring again to FIG. 5, once the end effector 52 is coupled with the charging receptacle, the charging controller 34 may charge the vehicle at 70 until the vehicle reports a state of charge (SoC) above a particular threshold. Finally, at 72, the charging controller 34 may instruct the robotic controller 56 to disconnect from the vehicle 12 and return to a home position. The charging controller 32 may monitor the total power provided to the vehicle 12 during the charging step 70, and may subsequently invoice or debit an account of the identified user.

Figures 9, 10:
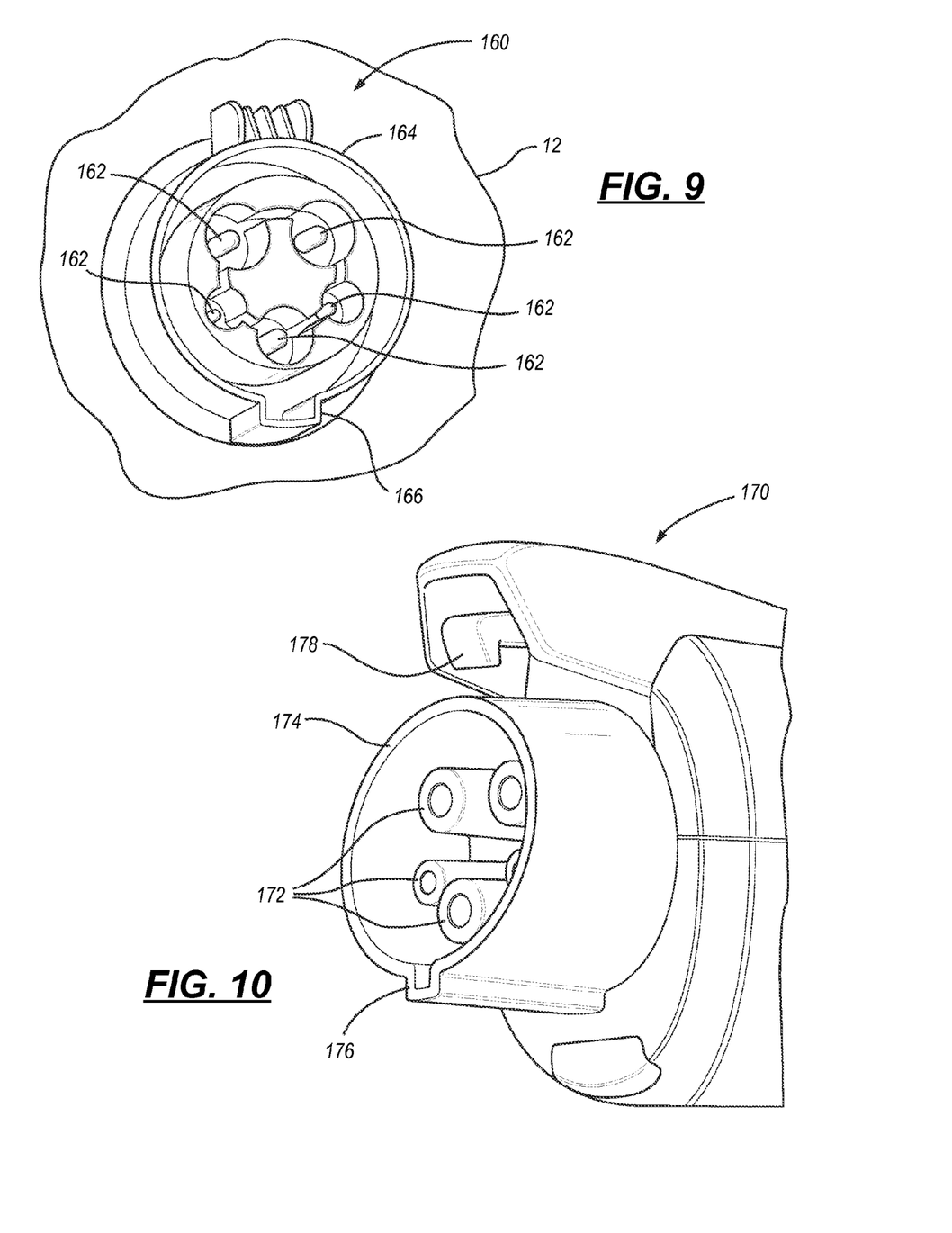
FIG. 9 is a schematic perspective view of a charging receptacle, such as may be disposed on an electric vehicle.
FIG. 10 is a schematic perspective view of an embodiment of an end effector for a robotic charging station.

FIG. 9 illustrates an example of a vehicle charging plug/receptacle 160 that may be included with an electric vehicle 12. As shown, the receptacle 160 may include a plurality of electrical contacts 162 and a mechanical guide 164 to aid in the proper alignment/coupling between the end effector 52 and the receptacle 160. The mechanical guide 164, for example, may encircle the plurality of electrical contacts 162, and may have one or more locating features 166 to promote proper axial alignment.

FIG. 10 illustrates a first embodiment of an end effector 170 that may be similar to the end effector 52 described above, and may be used to couple with the vehicle charging receptacle 160 of FIG. 9. As shown, the end effector 170 may include a plurality of electrical contacts 172 that are each configured to mate with a respective electrical contact 162 of the receptacle 160. The end effector 170 may further include a mechanical guide 174 that is adapted to fit within or over the mechanical guide 164 of the receptacle 160. A locating feature 176 of the end effector 170 may mate/engage with a similar locating feature 166 of the receptacle 160 to aid in providing proper alignment/orientation.

As illustrated in FIGS. 9-10, the locating feature 176 may be a keyed portion of the mechanical guide 172 that may prevent the end effector from being coupled with the receptacle in any manner except the proper orientation. The end effector 170 may further include a selectively engagable retaining clip 178 that may couple the end effector 170 to the receptacle 160. The clip 178 may both ensure proper interconnection/coupling (i.e., ensure that the end effector 170 is properly seated against the receptacle 160), and reduce the likelihood that a slight, inadvertent bump may de-seat the end effector 170.

Figure 11:
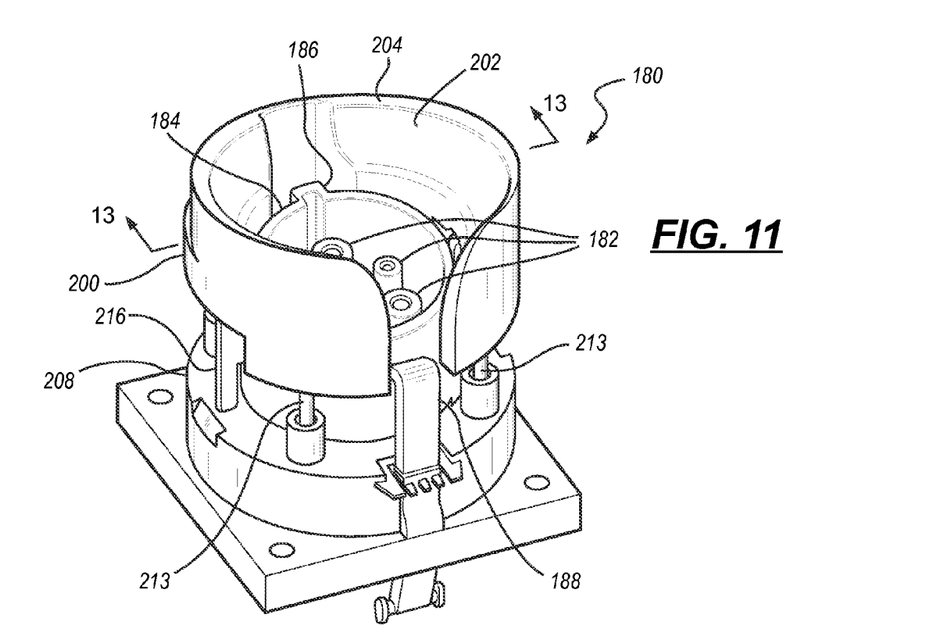
FIG. 11 is a schematic perspective view of an embodiment of an end effector for coupling with an electric vehicle.
Figure 12:
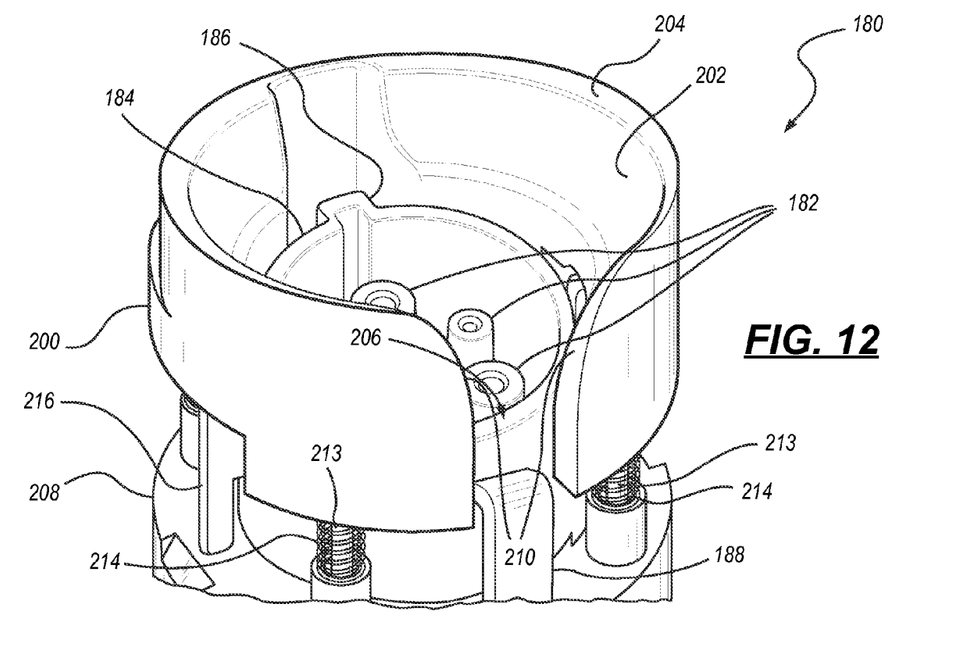
FIG. 12 is an enlarged schematic perspective view of a portion of the end effector provided in FIG. 11.

FIG. 11 illustrates another embodiment of an end effector 180 that may be similar to the end effector 52 described above, and may be used to selectively couple with the charging receptacle 160 of the vehicle 12. As shown, the end effector 180 may include a plurality of electrical contacts 182 that are each configured to mate with a respective electrical contact 162 of the receptacle 160.

The end effector 180 may include a mechanical guide 184 configured to generally surround the electrical contacts 182 and adapted to fit within or over the mechanical guide 164 of the receptacle 160. The mechanical guide 184 may include a locating feature 186 configured to mate/engage with a similar feature 166 of the receptacle 160 to aid proper alignment/orientation. As illustrated in FIGS. 9-11, the locating feature 186 may be a keyed portion of the mechanical guide 184 that may prevent the end effector 180 from being coupled with the receptacle 160 in any manner except in the proper orientation. The end effector 180 may further include a selectively engagable retaining clip 188 that may interlock with a protrusion provided on the receptacle 160. The retaining clip 188 may ensure proper electrical interconnection/coupling is established and maintained throughout the charging process (i.e., ensure that the end effector 180 is properly seated against the receptacle 160). In this manner, the clip 188 may reduce the likelihood that a slight, inadvertent bump to the connector/effector 180 or vehicle 12 may de-seat the end effector 180.

As generally illustrated in FIGS. 11-14, the end effector 180 may further include a retractable guide 200 that generally surrounds, or extends from the stationary mechanical guide 184, and may be adapted to further aid in aligning and orienting the connector/effector 180 with the receptacle 160. The retractable guide 200 may, for example, include an inward-facing chamfer 202 that generally extends from the leading edge 204. The chamfer 202 may be operative to funnel/translate a misaligned connector/effector 180 onto the receptacle 160. Additionally, the retractable guide 200 may include or define a slotted opening 206, which may extend from the leading edge 204 of the guide 200 toward the retaining clip 188. The slotted opening 206 may allow the protrusion of the receptacle 160 to pass unimpeded toward the base 208 of the connector/effector 180, where it may be engaged by the clip 188. The retractable guide 200 may include a secondary chamfer 210 on either side of the slotted opening 206 to funnel the protrusion toward the clip 188. In doing so, the secondary chamfer 210 may correct minor axial orientation differences between the receptacle 160 and the connector/effector 180.

Figure 13:
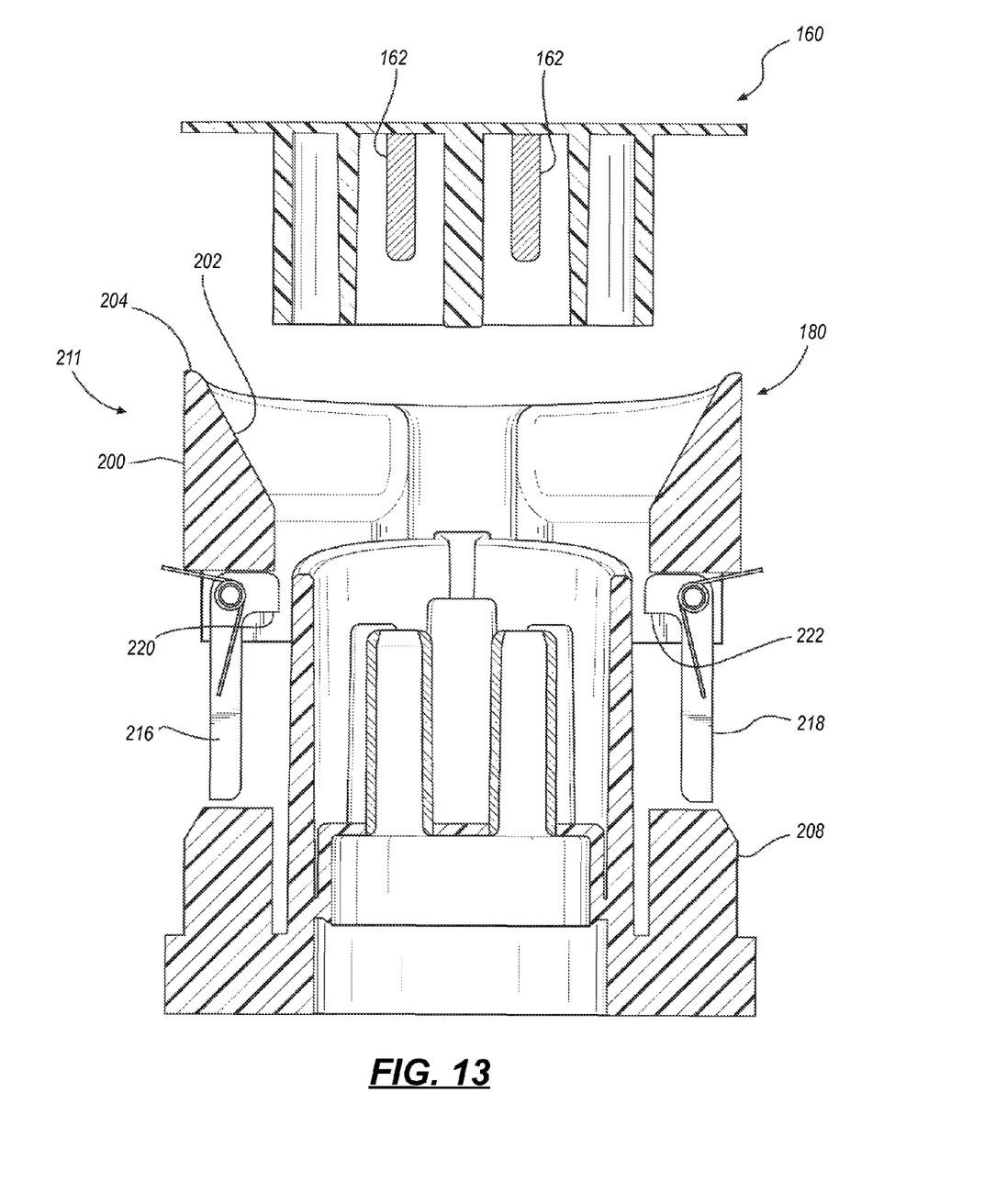
FIG. 13 is a schematic partially exploded crossectional view of the end effector provided in FIG. 11, taken along line 13-13, shown with the retractable guide in an extended state.
Figure 14:
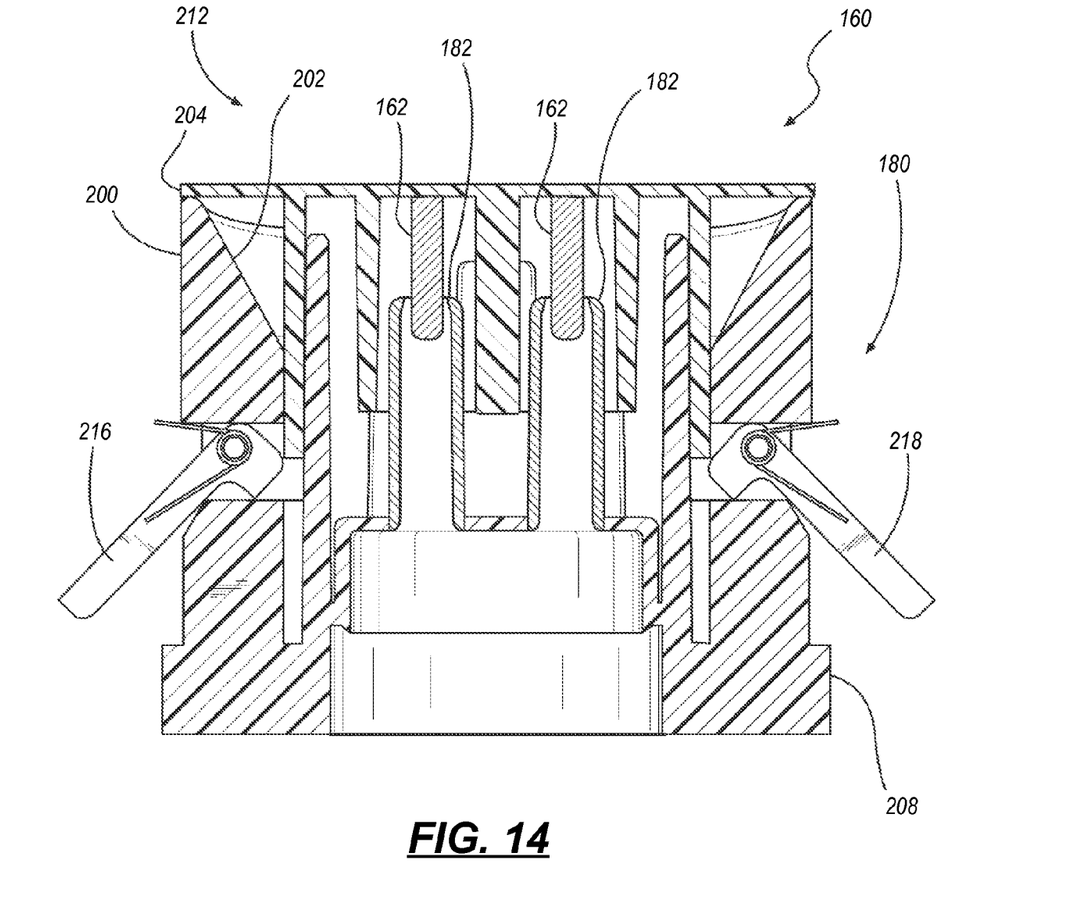
FIG. 14 is a schematic crossectional view of an end effector, such as provided in FIG. 11, taken along line 13-13, shown with the retractable guide in a collapsed state.

As generally illustrated in FIGS. 13-14, the retractable guide may transition between an extended state 211, as generally shown in FIG. 13, and a collapsed state 212, as generally illustrated in FIG. 14. When in an extended state 211, the retractable guide 200 may therefore be used to fine-tune the relative positions of the connector/effector 180 and receptacle 160 before the electrical contacts 162, 182 engage each other. In this manner, the respective electrical contacts 162, 182 may suitably interconnect without any jamming/buckling. Once the end effector 180 has been properly guided into a proper relative position vis-à-vis the receptacle 160, the retractable guide 200 may transition to a collapsed state 212 against the connector base 208 to allow the end effector 180 to more fully engage the receptacle 160 without obstruction.

In one configuration, the retractable guide 200 may ride along one or more guide posts 213, which may allow it to collapse against the base 208. A plurality of sufficiently stiff, pre-stressed springs 214 may be disposed about the guide posts 213 and may provide some resilience against the collapsing motion and/or may allow the retractable guide 200 to extend when the connector/effector 180 is removed from the receptacle 160. During the collapsing/retracting motion, the springs 214 may be compressed between the retractable guide 200 and the base 208 of the connector/effector 180. In one configuration, the springs 214 may maintain the retractable guide 200 in an extended state 211, and with sufficient resilience/support to permit the guide 200 to accomplish its guiding function prior to collapsing. Once the end effector 180 is properly aligned, the advancement of the connector/effector 180 may exert a sufficiently strong force against the retractable guide 200 to counteract the load exerted by the springs, and may cause the springs to elastically compress.

In another configuration, as generally illustrated in FIGS. 11-14, the retractable guide 200 may be supported and/or locked in an extended position 211 using support legs 216, 218 that may remain in place until actively released (as shown in FIG. 14). In an embodiment, the legs 216, 218 may be pivotably connected with the retractable guide 200. The support legs 216, 218 may be pivotable between a first position (illustrated in FIG. 13) and a second position (illustrated in FIG. 14). The support legs 216, 218 may be configured to maintain the retractable guide 200 in the extended state 211 when in the first position, and configured to allow the retractable guide 200 to transition to the collapsed state 212 when pivoted to the second position. More specifically, as generally illustrated in FIG. 13, the legs 216, 218 may ordinarily extend between the retractable guide 200 and the base 208, and may prevent the retractable guide 200 from collapsing/retracting along the guide posts 213. Once the end effector 180 slides onto the receptacle 160, the receptacle 160 may contact a protrusion 218, 202 extending from each respective leg 216, 218 and cause the legs 216, 218 to pivot outward. Once pivoted out of a supporting position, the retractable guide 200 may collapse against the base portion 208.

While the above description (with respect to FIGS. 9-15) describes two potential configurations of an end effector 52, other configurations may likewise be used.

Figure 15:
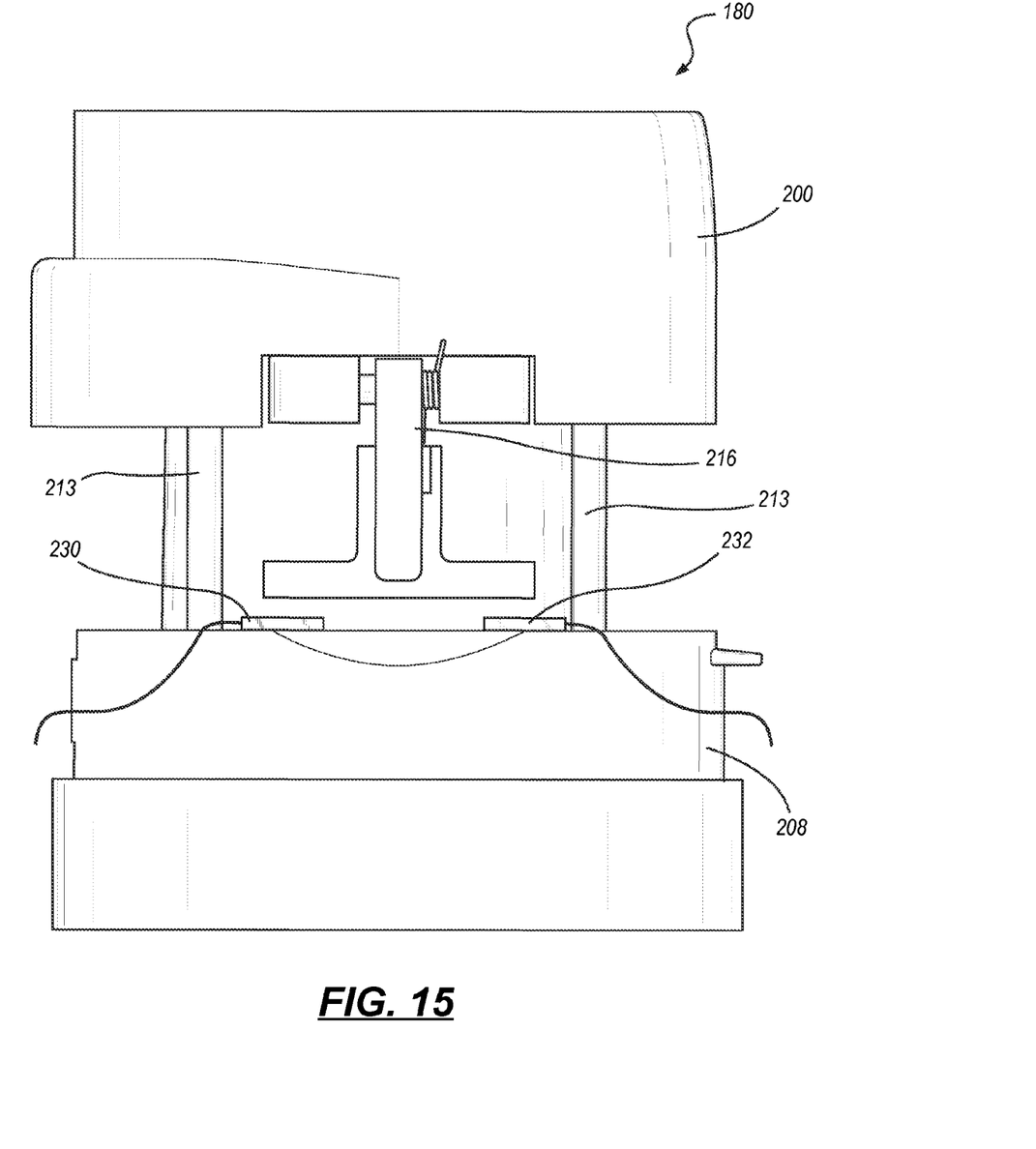
FIG. 15 is a schematic side view of an embodiment of an end effector including force sensing means.

As generally illustrated in FIG. 15, one or more force sensors 230, 232 may be included on the base 208 adjacent to each pivoting leg (e.g., leg 216). A portion of the leg 216 (or an extension thereof) may be configured to contact the force sensors 230, 232 when the leg is disposed in a supporting position between the base 208 and the guide 200. In this manner, the force sensors 230, 232 may provide an indication of the contact forces applied to the retractable guide 200 to the robotic controller 56. This feedback may be used to estimate the approximate magnitude and direction of any contact made with the retractable guide 200 or to indicate that the guide has suitably retracted and a mechanical coupling has been achieved. For example, if the retractable guide 200 is contacted off-center by the receptacle 160, the load may then be transmitted to one or more of the respective force sensors 230, 232. This feedback may be useful in determining whether the end effector 180 has been sufficiently advanced onto the receptacle 160 to cause the guide 200 to retract and establish a secure coupling. Alternatively, in a robotic context, the contact-sensitive feedback may be used to more precisely control the final approach and interconnection. In one embodiment, the force sensors 230, 232 may be force sensitive resistors that have a variable resistance depending on the amount of applied force.

Referring again to FIGS. 1-2, in general, the vehicle charging station 10 may provide a conditioned supply of electrical power to a vehicle 12 from a power source such as an external electrical grid or a large number of solar cells. To accomplish this, the charging station 10 may include a power delivery circuit 32 that receives either one or three phase AC electrical power 33, and is configured to output either direct current (DC) electrical power, or alternating current (AC) electrical power. Depending on the nature of the external power supply, the power delivery circuit 32 may include an inverter/converter to provide the vehicle with the properly conditioned, rectified, and/or filtered AC or DC power supply.

In one configuration, the power delivery circuit 32 may output an electrical charge that has a voltage in the range of 200-500 VAC or 400-500 VDC, and a total power less than approximately 50 kW. Such a system requires considerably lower power capabilities than a comparable charging station that utilizes dedicated charging terminals at each parking space 14. For example, the present system 10 may draw 50 kW for eight parking spaces, whereas eight dedicated terminals may draw a collective 400 kW.

Figure 16:
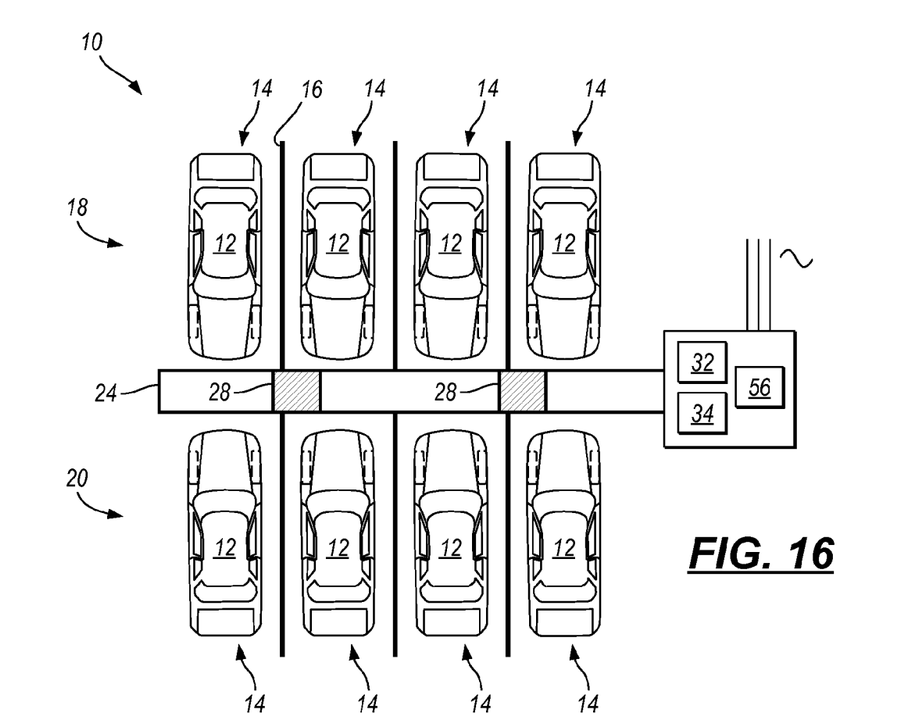
FIG. 16 is a schematic plan view of an electric vehicle charging station employing two ground mounted movable charging apparatuses.
Figure 17:
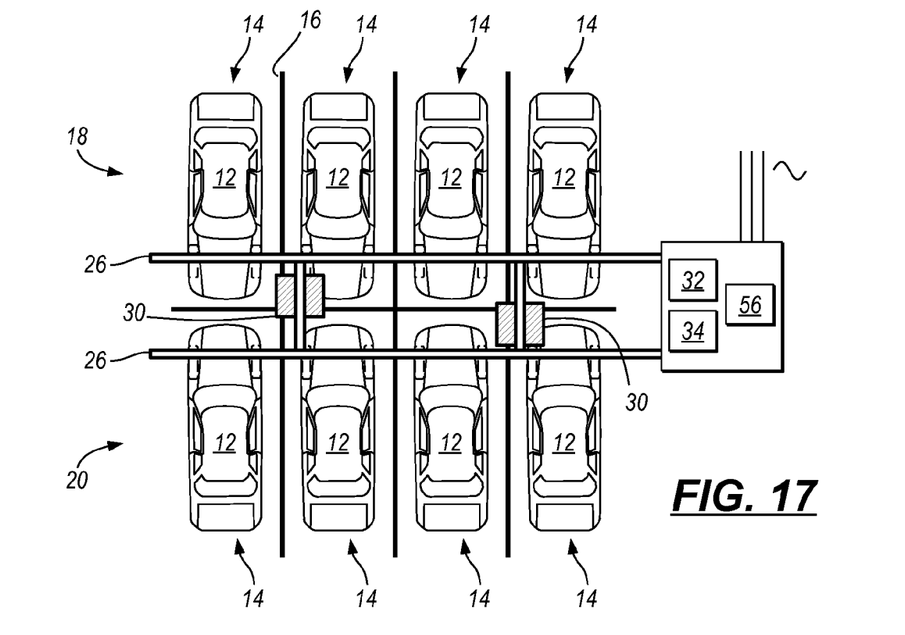
FIG. 17 is a schematic plan view of an electric vehicle charging station employing two overhead mounted movable charging apparatuses.

In another configuration, such as generally illustrated in FIGS. 16-17, multiple movable charging apparatuses 28, 30 may be disposed on each respective track 24, 26. In this manner, the two apparatuses may divide the charging duties to avoid large charging queues, though may employ a single track (albeit requiring a power circuit 32 with twice the power capacity).

Figure 18:
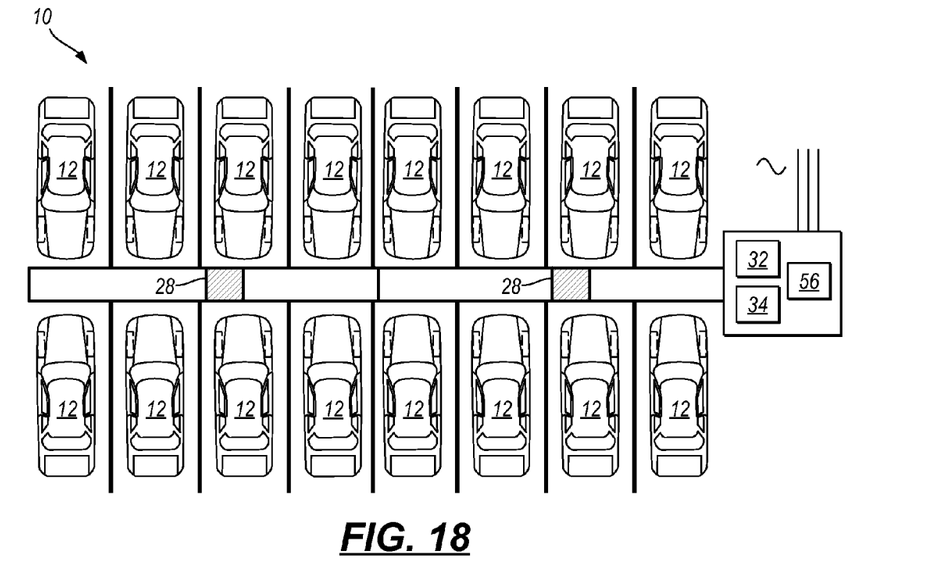
FIG. 18 is a schematic plan view of two adjacent and interconnected electric vehicle charging stations, each employing a respective ground mounted movable charging apparatus.
Figure 19:
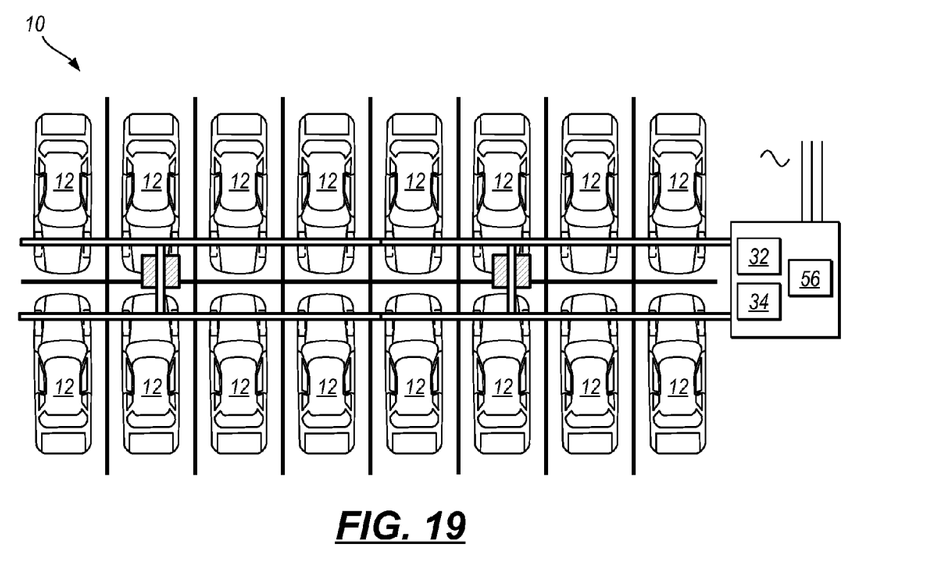
FIG. 19 is a schematic of two adjacent and interconnected electric vehicle charging stations, each employing a respective overhead mounted movable charging apparatus.

In still another configuration, such as generally illustrated in FIGS. 18-19, multiple charging stations 10 may be arranged in an adjacent fashion to provide for easy scalability. In this configuration, each charging station 10 may include its own dedicated movable charging apparatus 28, 30. In another configuration, the various movable charging apparatuses 28, 30 may be freely translatable between adjacent tracks to facilitate greater flexibility and scalability.

In addition to the robotic concepts identified above, the presently described electric vehicle charging station 10 may employ any of the vehicle presence detection means, robotic control means, charging receptacle identification means, end effector guidance means, and/or any other concepts that may be disclosed in U.S. patent application Ser. No. 13/484,345 (U.S. Patent Publication No. 2013/0076902), filed on 31 May 2012, and entitled "ROBOTICALLY OPERATED VEHICLE CHARGING STATION," which is incorporated by reference in its entirety.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A vehicle charging station comprising:
a track configured to extend across a plurality of vehicle parking spaces;
a movable charging apparatus supported by the track and translatable along the track between the plurality of vehicle parking spaces, the movable charging apparatus including:
a base slidably coupled with the track; and
an end effector in mechanical communication with the base and configured to electrically couple with an electric vehicle disposed within one of the plurality of vehicle parking spaces; and a power delivery circuit configured to receive an electrical charge from a power source and to controllably provide the electrical charge to the electric vehicle.

2. The vehicle charging station of claim 1, further comprising a processor configured to:
   detect the presence of the electric vehicle within the parking space;
   determine a state of charge of a traction battery associated with the electric vehicle;
   direct the movable charging apparatus to provide an electrical charge to the electric vehicle if the state of charge is below a threshold.

3. The vehicle charging station of claim 2, wherein the processor is further configured to:
   determine an identity of the detected electric vehicle within the parking space;
   determine an amount of an electrical charge provided to the electric vehicle by the movable charging apparatus; and
   generate an invoice from the determined identity and the amount of provided electrical charge.

4. The vehicle charging station of claim 2, wherein the processor is configured to determine a state of charge of a traction battery associated with the electric vehicle through one or more wireless signals received from the vehicle.

5. The vehicle charging station of claim 1, wherein the movable charging apparatus further includes a mechanical arm coupling the end effector to the base; and
   wherein the mechanical arm includes a plurality of actuatable joints capable of moving the end effector in at least 5 degrees of freedom.

6. The vehicle charging station of claim 5, further comprising a robotic controller coupled with the plurality of actuatable joints and configured to:
   locate a charging receptacle on the vehicle;
   obtain access to the charging receptacle;
   control the one or more of the actuatable joints to align the end effector with the charging receptacle; and
   electrically couple the end effector with the charging receptacle.

7. The vehicle charging station of claim 6, wherein the robotic controller is configured to locate a charging receptacle on the vehicle by receiving a radio frequency locating signal from a location proximate to the charging receptacle.

8. The vehicle charging station of claim 6, wherein the robotic controller is configured to obtain access to the charging receptacle by providing a wireless command to the vehicle to open a charging receptacle door.

9. The vehicle charging station of claim 6, wherein the robotic controller is configured to obtain access to the charging receptacle by controlling the one or more of the actuatable joints such that the end effector opens a door that selectively covers the charging receptacle.

10. The vehicle charging station of claim 6, wherein the robotic controller is configured to locate a charging receptacle on the vehicle by:
    receiving at least one of electromagnetic radiation and sound pressure waves; and
    identifying indicia of the charging receptacle from the at least one of electromagnetic radiation and sound pressure waves.

11. The vehicle charging station of claim 10, wherein the electromagnetic radiation from which the indicia are identified has a wavelength in the range of 400 nm to 750 nm.

12. The vehicle charging station of claim 10, wherein the sound pressure waves from which the indicia are identified have a frequency above 30 kHz.

13. The vehicle charging station of claim 1, wherein the movable charging apparatus further includes a flexible electrical cable coupling the end effector to the base.

14. The vehicle charging station of claim 1, wherein the provided electrical charge has a voltage in the range of 200-500 VAC or 400-500 VDC.

15. The vehicle charging station of claim 1, wherein the movable charging apparatus has a total power consumption is less than 50 kW.

16. The vehicle charging station of claim 1, wherein the track is disposed on the ground.

17. The vehicle charging station of claim 1, wherein the track is disposed above the ground, such that the movable charging apparatus is substantially located between the ground and the track.

18. The vehicle charging station of claim 1, wherein the plurality of vehicle parking spaces is a first plurality of vehicle parking spaces; and
    wherein the track is disposed between the first plurality of vehicle parking spaces and a second plurality of vehicle parking spaces.

19. The vehicle charging station of claim 1, wherein the movable charging apparatus is a first movable charging apparatus;
    further comprising a second movable charging apparatus supported by the track and translatable along the track; and
    wherein the first movable charging apparatus is substantially identical to the second movable charging apparatus.

* * * * *